United States Patent [19]
Miller et al.

[11] 3,858,176
[45] Dec. 31, 1974

[54] ELECTRICAL SWITCH ASSEMBLY

[75] Inventors: Gerald K. Miller; Dale L. Bull; Norman A. Rautiola, all of Reed City, Mich.

[73] Assignee: Nartron Corporation, Reed City, Mich.

[22] Filed: May 3, 1972

[21] Appl. No.: 250,048

[52] U.S. Cl............. 340/73, 200/61.27, 200/61.34, 200/61.54
[51] Int. Cl........ B60q 1/34, H01h 3/16, H01h 9/00
[58] Field of Search............ 200/61.27, 61.3, 61.34, 200/61.35, 61.36, 61.54; 340/73, 81 R, 81 F

[56] References Cited
UNITED STATES PATENTS

| | | | |
|---|---|---|---|
| 2,278,031 | 3/1942 | Wiglesworth | 200/61.32 |
| 2,690,483 | 9/1954 | Elliott et al. | 200/61.35 |
| 2,788,405 | 4/1957 | Benquet | 200/61.27 |
| 2,792,463 | 5/1957 | Lincoln et al. | 200/61.54 |
| 2,812,395 | 11/1957 | Webb | 200/61.34 |
| 2,854,649 | 9/1958 | Bosher | 340/81 R X |
| 2,863,013 | 12/1958 | Brown et al. | 200/61.34 |
| 2,863,096 | 12/1958 | Hollins | 340/81 R X |
| 2,891,118 | 6/1959 | Hollins | 200/61.27 X |
| 3,076,067 | 1/1963 | Dryer et al. | 200/61.3 |
| 3,114,015 | 12/1963 | Magazanik | 200/61.27 |
| 3,300,601 | 1/1967 | DuRocher et al. | 200/61.34 |
| 3,408,467 | 10/1968 | Shenstone et al. | 200/61.34 X |
| 3,459,909 | 8/1969 | Winogrocki et al. | 200/61.34 |
| 3,564,166 | 2/1971 | Cartwright | 200/166 J X |
| 3,591,740 | 7/1971 | Kolster | 200/61.27 |
| 3,632,907 | 1/1972 | Gleeson | 200/61.27 X |
| 3,671,701 | 6/1972 | Bellmann | 200/166 J |
| 3,684,850 | 8/1972 | Kader et al. | 200/166 J X |
| 3,699,286 | 10/1972 | Suzuki et al. | 20/61.34 |

FOREIGN PATENTS OR APPLICATIONS

| | | | |
|---|---|---|---|
| 86,455 | 1/1966 | France | 200/61.27 |
| 1,385,949 | 12/1964 | France | 200/61.27 |
| 1,163,807 | 5/1958 | France | 340/81 R |
| 1,060,454 | 7/1959 | Germany | 200/61.27 |

*Primary Examiner*—Donald J. Yusko
*Assistant Examiner*—K. Leimer
*Attorney, Agent, or Firm*—Lon H. Romanski

[57] ABSTRACT

A switch assembly has an outer housing containing a generally medially disposed cam member carried by an actuating handle extending beyond the housing; a first plurality of laterally spaced electrical contacts are situated on one side of the cam member and a second plurality of laterally spaced electrical contacts are situated on the other side of the cam member with all of such contacts being subject to be acted upon by the cam member depending on the direction of movement of the handle; a third plurality of contacts are situated generally medially of the first and second plurality of contacts so that when the cam member is moved thereagainst all three pluralities of contacts are acted upon by the cam member; resilient detent means are provided to maintain selected operating positions of the cam member.

29 Claims, 21 Drawing Figures

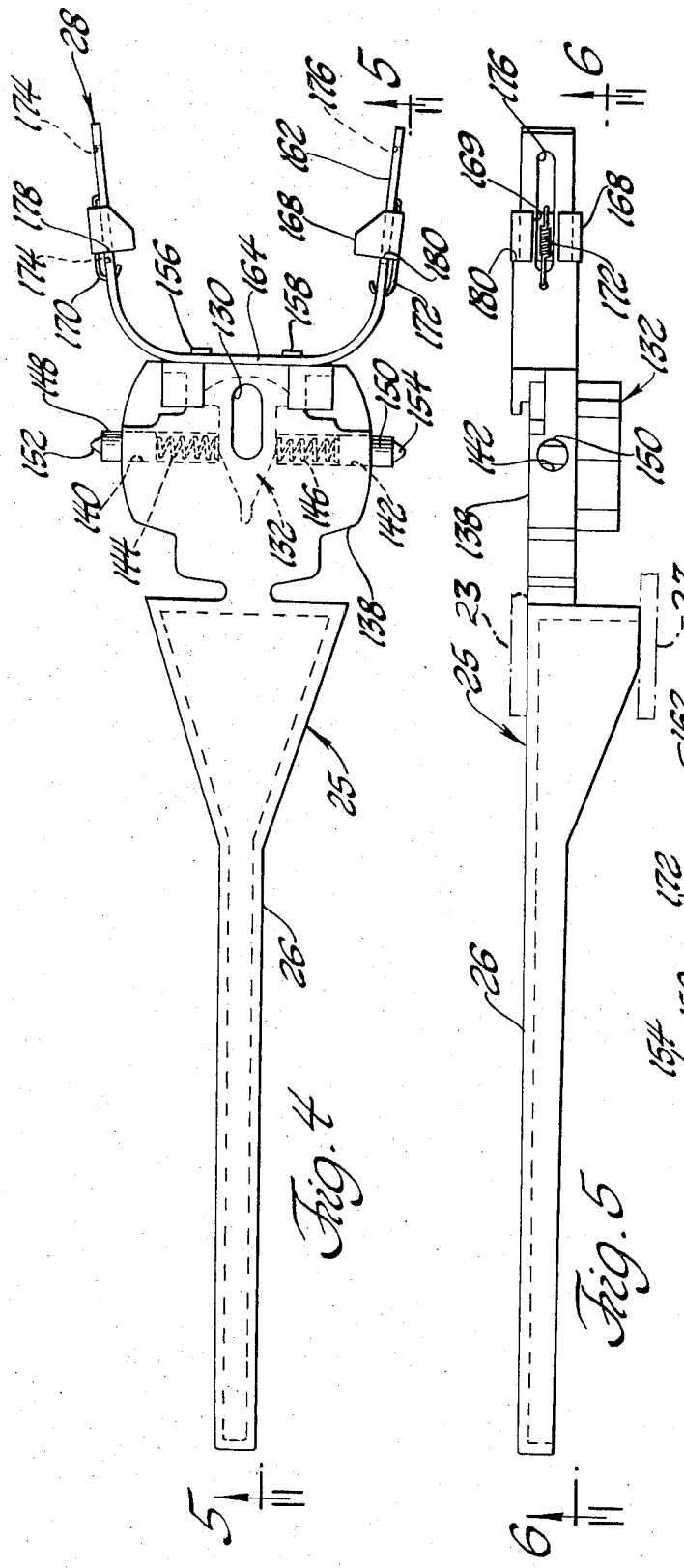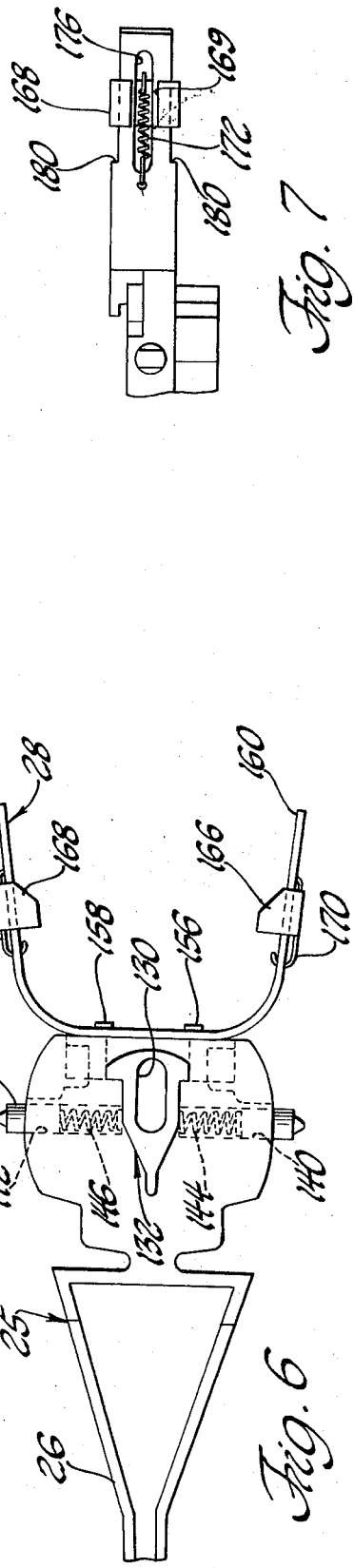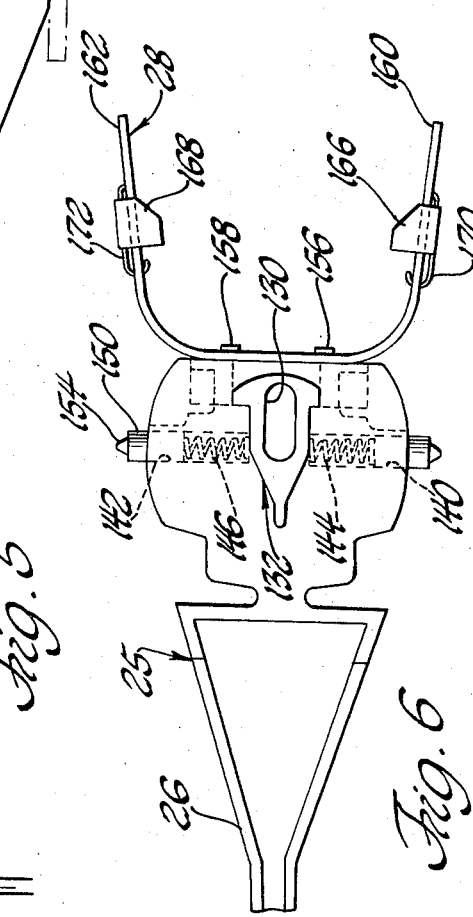

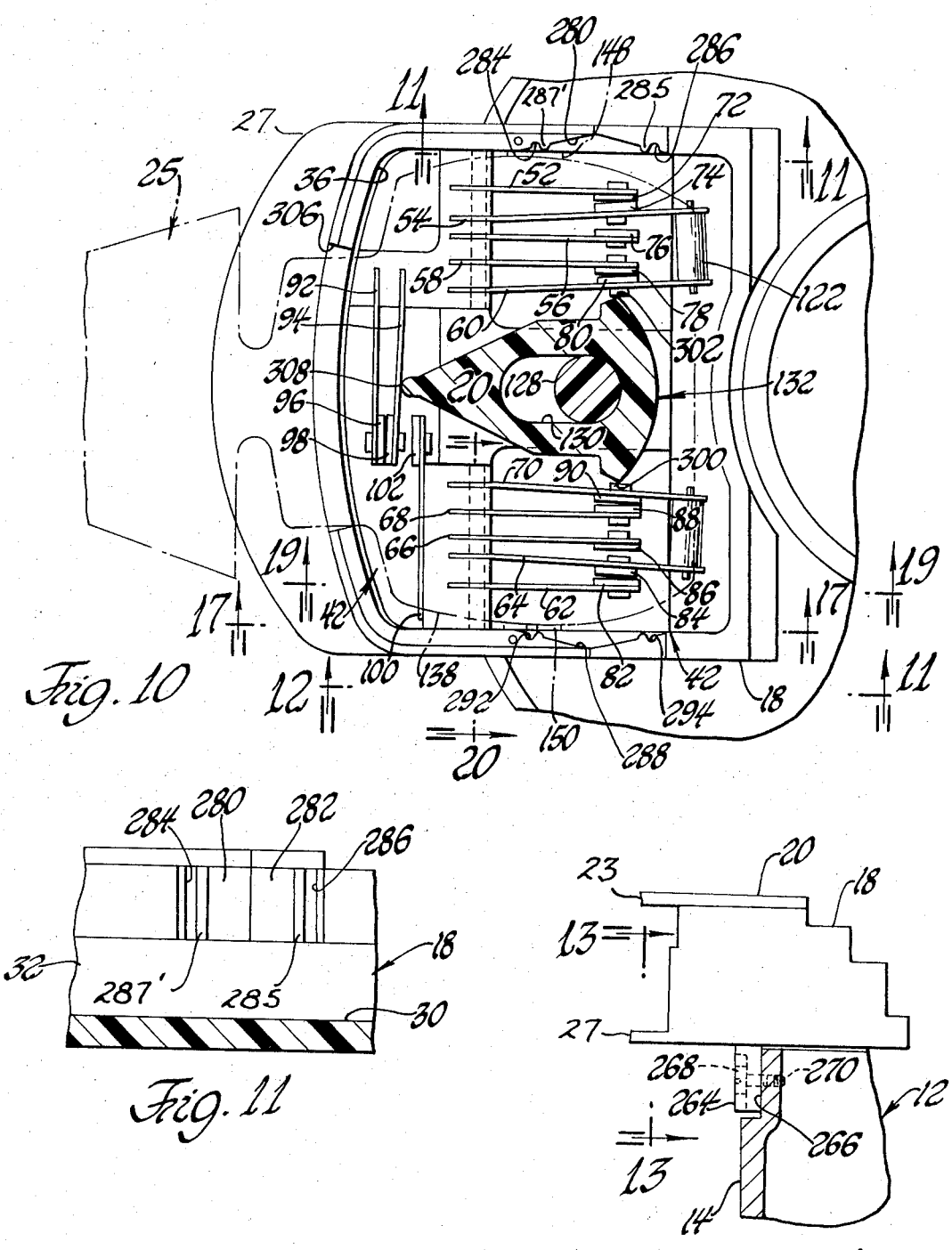

3,858,176

ELECTRICAL SWITCH ASSEMBLY

BACKGROUND OF THE INVENTION

Electrical switch assemblies of the prior art employed, for example, as turn indicator and emergency warning switch assemblies for use in automobiles and the like have been relatively complicated structures which required, among other things, a partial disassembly of the vehicular steering column assembly in order to either repair or replace such switch means. Further, because of the configurations which such prior art switch assemblies had to conform to in order to be generally included within the steering column assembly, such switch assemblies were often highly susceptible to various forms of failure.

Accordingly, the invention as herein disclosed and claimed is directed to the solution of the above as well as other attendant problems.

SUMMARY OF THE INVENTION

According to the invention, an electrical switch assembly comprises a support body, cam means comprising a support body, cam means carried by said support body, lever means operatively connected to said cam means for moving said cam means to and from various operating positions, a plurality of electrical contacts carried by said support body and arranged in generally close proximity to said cam means, said plurality of electrical contacts being adapted for electrical connection to related electrical circuitry, resilient resistance means effective for resiliently resisting movement of said cam means by said lever means towards any of said operating positions, said resilient resistance means being effective to progressively increase the magnitude of resilient resistance as said cam means is moved toward any of said operating positions, and additional means effective for resiliently latching said cam means in any one of said operating positions when said cam means has been moved to said one operating position.

Various general and specific objects and advantages of the invention will become apparent when reference is made to the following written description considered in conjunction with the accompanying drawings.

DESCRIPTION OF THE DRAWINGS

In the drawings, wherein for purposes of clarity certain details or elements may be omitted from one or more views:

FIG. 4 is a top plan view of the handle and actuator means as it would appear removed from the switch assembly;

FIG. 5 is a side elevational view taken generally on the plane of line 5—5 of FIG. 4 and looking in the direction of the arrows;

FIG. 6 is a fragmentary bottom view taken generally on the plane of line 6—6 of FIG. 5 and looking in the direction of the arrows;

FIG. 7 is a view similar to a fragmentary portion of FIG. 5 but illustrating the elements thereof under a particular condition of operation;

FIG. 10 is a view similar to either FIGS. 2, 8 or 9 but illustrating the switch assembly in a third disclosed mode of operation;

FIG. 11 is a fragmentary cross-sectional view taken generally on the plane of line 11—11 of FIG. 10 and looking in the direction of the arrows;

FIG. 12 is a side elevational view of the switch housing situated within an accommodating opening formed in the associated steering column housing which is shown fragmentarily and in cross-section;

FIG. 13 is a fragmentary elevational view taken generally on the plane of line 13—13 of FIG. 12;

DESCRIPTION OF THE PREFERRED EMBODIMENT

Figure 1:
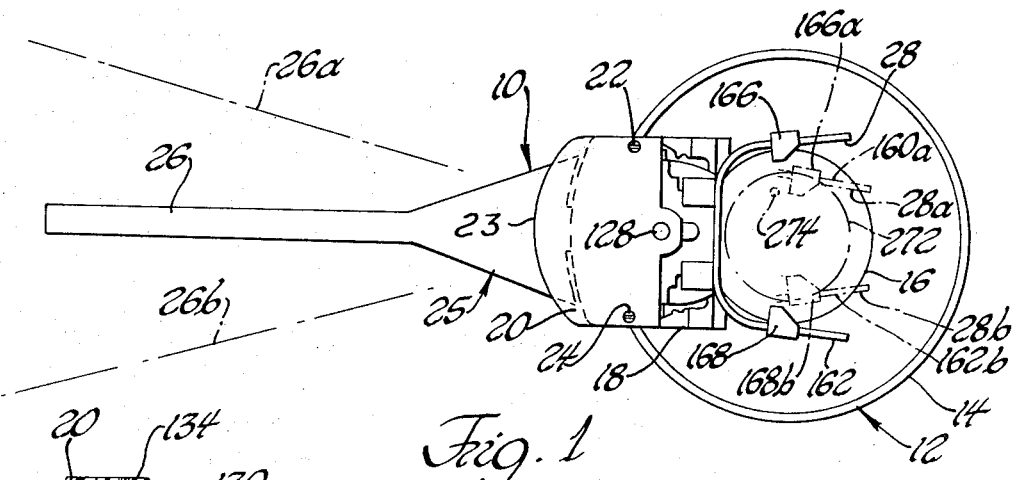
FIG. 1 is generally a top plan view of the switch assembly of the invention shown assembled to a vehicular steering column assembly portions of which have been removed for clarity.

Referring now in greater detail to the drawings, FIG. 1 illustrates a switch assembly 10 situated in a vehicular steering column assembly 12, viewed generally axially of the column assembly 12. As is generally well known in the art, the assembly 12 may be comprised of an outer housing 14 containing therein a suitable journalled rotatable steering gear shaft or rod 16 which is connected as to an operator controlled steering wheel (not shown) and to related linkage means leading to steerable vehicular support wheels. As illustrated in FIG. 1, the switch assembly 10 is comprised of a housing 18, a cover 20 suitably secured thereto as by screws 22 and 24, a lever portion 26 intended for manual actuation, and a generally U-shaped abutment means 28.

Figure 2:
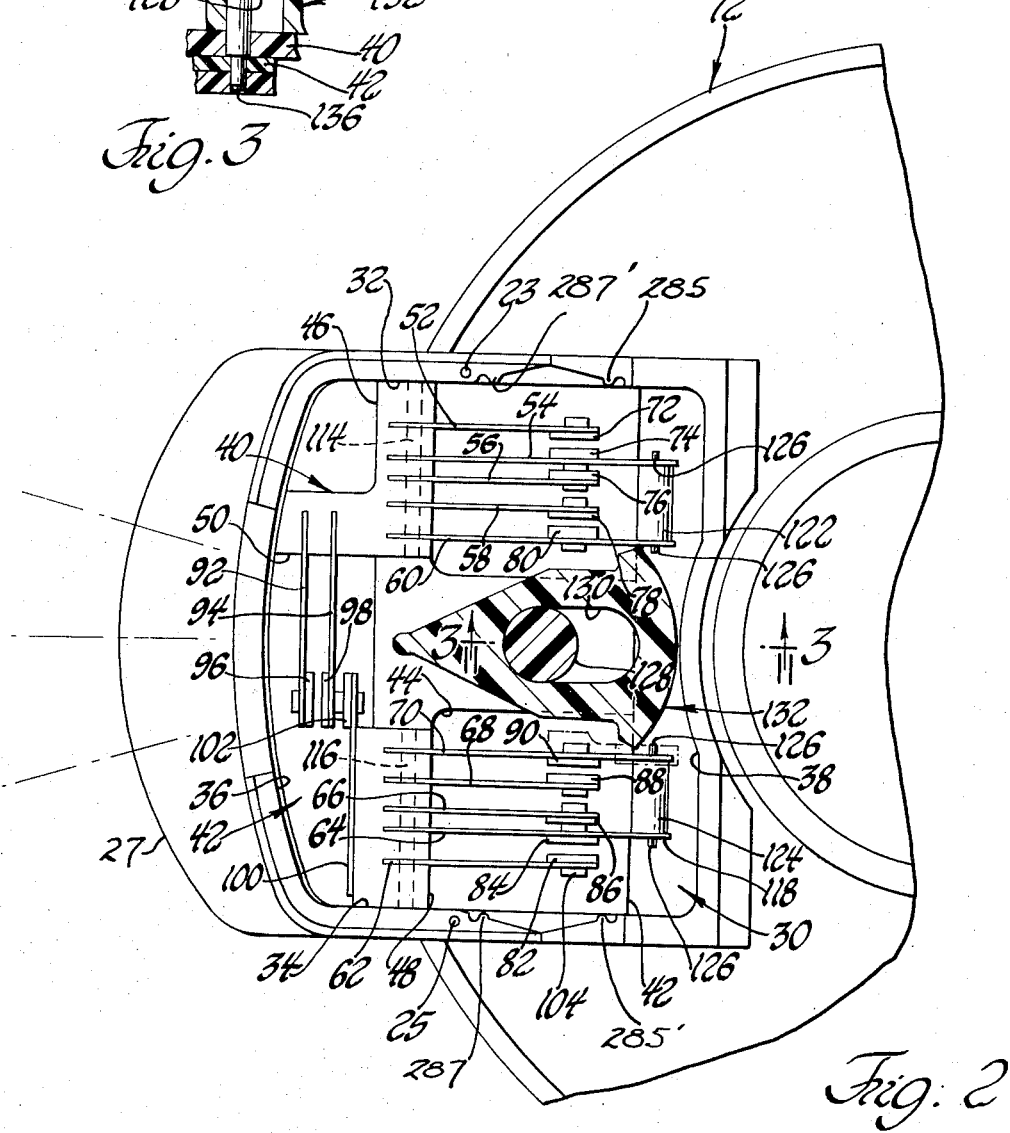
FIG. 2 is an enlarged fragmentary portion of the switch assembly of FIG. 1 with the cover thereof removed and including a cam portion (carried by one of the removed elements) to illustrate its relationship to the remaining elements.

FIG. 2, in enlarged scale, illustrates the switch housing 18, carried by the column assembly 12, with the cover 20 and handle 26 removed therefrom in order to illustrate the interior of the housing 18 as well as the several elements contained therein.

The housing 18 is shown as being formed of a plastic material as to be comprised of integrally formed base portion or bottom wall 30, opposed side walls 32 and 34 and rear and forward walls 36 and 38. (Walls 36 and 38 may also be considered as being respectively outer and inner walls in relationship to their respective radial positions when assembled to the steering column assembly 12.)

Figure 18:
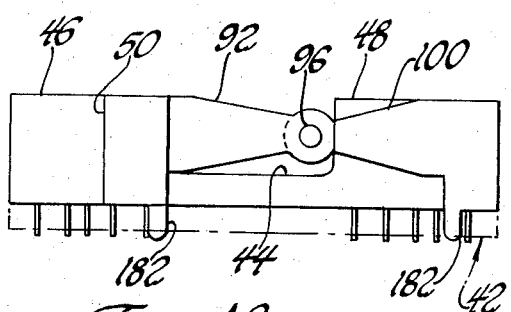
FIG. 18 is an end elevational view taken generally on the plane of line 18—18 of FIG. 1 and looking in the direction of the arrows.

A switch contact mounting member 40 made of a suitably electrically non-conductive material such as, for example, polycarbonate, is, as will be shown, situated on and atop a printed circuit mounting board 42. As shown in FIG. 2 as well as in FIGS. 17 & 18, the switch contact mounting member is formed to have a lower disposed base portion 44 and preferably integrally formed upstanding contact mounting portions 46, 48 and 50 each of which is adapted to carry or retain what might be referred to as a bank of switch contacts. For example, a first bank of such switch contacts or members may be comprised of electrically conductive and resilient leafs 52, 54, 56, 58 and 60 respectively carrying electrical contacts 72, 74, 76, 78 and 80. A second bank of such switch contacts or members may be comprised of electrically conductive and resilient leafs 62, 64, 66, 68 and 70 respectively carrying electrical contacts 82, 84, 86, 88 and 90. A third bank of such switch contacts or members may be comprised of electrically conductive and resilient leafs 92 and 94, having electrically contacts 96 and 98, generally cooperating with a third electrically conductive resilient leaf 100 carried by the mounting portion 48 and having an electrical contact 102. Preferably, as shown, the various electrical contacts are of the type having a stem-like portion (typically identified as at 104) which passes through a cooperating aperture formed in the related electrically conductive and resilient contact leaf so as to extend some distance therebeyond.

Figure 19:
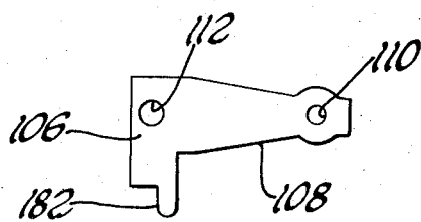
FIG. 19 is a typical side elevational view of the contact leafs taken generally on the plane of line 19—19 of FIG. 10 and looking in the direction of the arrows.
Figure 20:
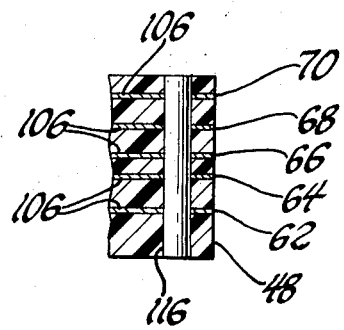
FIG. 20 is a fragmentary cross-sectional view taken generally on the plane of line 20—20 of FIG. 10 and looking in the direction of the arrows.

As generally typically illustrated in FIG. 19, each of the electrically conductive resilient leafs has a body portion 106 and an integrally formed arm portion 108. A first aperture 110 is formed through the arm portion 108 so as to accommodate the passage therethrough of the stem 104 of a related electrical contact while a second aperture 112 is formed through the body portion 106 so as to accommodate the passage therethrough of one of the two electrically non-conductive retainer pins 114 or 116.

The body portion 106 of each of the leafs 52, 54, 56, 58, 60, 62, 64, 66, 68, 70, 92, 94 is closely received within a cooperating slot formed in mounting portions 46, 48 or 50 as the case may be, after which the retainer pins 114 and 116 are inserted into mounting portions 46 and 48 respectively as to thereby mechanically lock the leafs in assembled relationship to the mounting block 40. Even though pins 114 and 116 have been specifically illustrated it is, of course, apparent that such leafs could be retained by any suitable means such as, for example being integrally molded in the associated support structure. Although leaf 100 may be similarly situated within a cooperating slot, it nevertheless may be merely suitably cemented or otherwise retained to upstanding mounting portion 48.

Resilient electrically conductive leafs 54, 60, 70 and 64 differ from the other remaining leafs in that each is provided with an arm extension portion 118 with an aperture 120 formed therethrough generally near the free end thereof. (Also see FIG. 17.) Pairs of such leafs, namely, 54, 60, and 70, 64 carry between them electrically non-conductive separators 122 and 124, respectively, as by means of axial extensions 126 formed on such separators and extending through the respective apertures 120.

Figure 3:
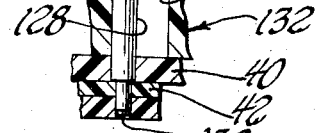
FIG. 3 is a fragmentary cross-sectional view, in reduced scale, taken generally on the plane of line 3—3 of FIG. 2 and looking in the direction of the arrows.

FIG. 3, a fragmentary cross-sectional view taken on line 3--3 of FIG. 2 and in reduced scale, illustrates the fact that a guide and retainer pin 128 generally passes through an elongated slot 130 formed through a cam portion 132 (carried by the actuating handle) and has its opposite ends 134 and 136 received in and contained by the cover member 20 and base or bottom wall 30 of housing 18.

Referring now in greater detail to FIGS. 4, 5, 6, and 7, the manually positionable actuating mechanism 25 is illustrated as being comprised of a handle portion 26 integrally formed with a body portion 138 which, in turn, carries the cam portion 132 at the underside thereof. Oppositely directed passages 140 and 142 formed in body portion 132 respectively receive therein springs 144 and 146 as well as axially slidable detent-like members 148 and 150, respectively having rounded nose-like projections 152, 154. The U-shaped cancelling member 28 may be secured to the end of body 138 as by screws 156 and 158.

The U-shaped member 28 is comprised of legs 160 and 162 joined as by a bight portion 164 through which the shanks of screws 156 and 158 pass. Legs 160 and 162 respectively slideably carry abutment members 166 and 168 which are slotted at one side (typically shown at 160) as to accommodate springs 170 and 172 therein with such springs being anchored at their respective one ends to legs 160 and 162 while their respective other ends are connected to the abutment members 166 and 168. Legs 160 and 162 are further provided with elongated slots 174 and 176 formed therein as to accommodate the extension therethrough of the springs 170 and 172. Each of the legs 160 and 162 is also formed of a generally stepped width in order to thereby define shoulder-like stops 178 and 180. Generally, when the actuating member 25 is in what may be called a neutral position, springs 170 and 172 respectively cause abutment members 166 and 168 to be resiliently held against stops 178 and 180; however, under certain other conditions, either of the abutment members may be moved away from such cooperating stop as typically shown in FIG. 7.

FIG. 19 also typically illustrates that the respective body portions of the various electrically conductive and resilient leafs or contact supports are each provided with a downwardly depending tab-like extension 182 of a length sufficient to extend through the contact support 40 and into appropriate apertures formed in the printed circuit board 40 (generally depicted in FIGS. 17 and 18) to there become electrically joined, as by soldering, to certain of the electrical circuits printed on such board 40.

Figure 14:
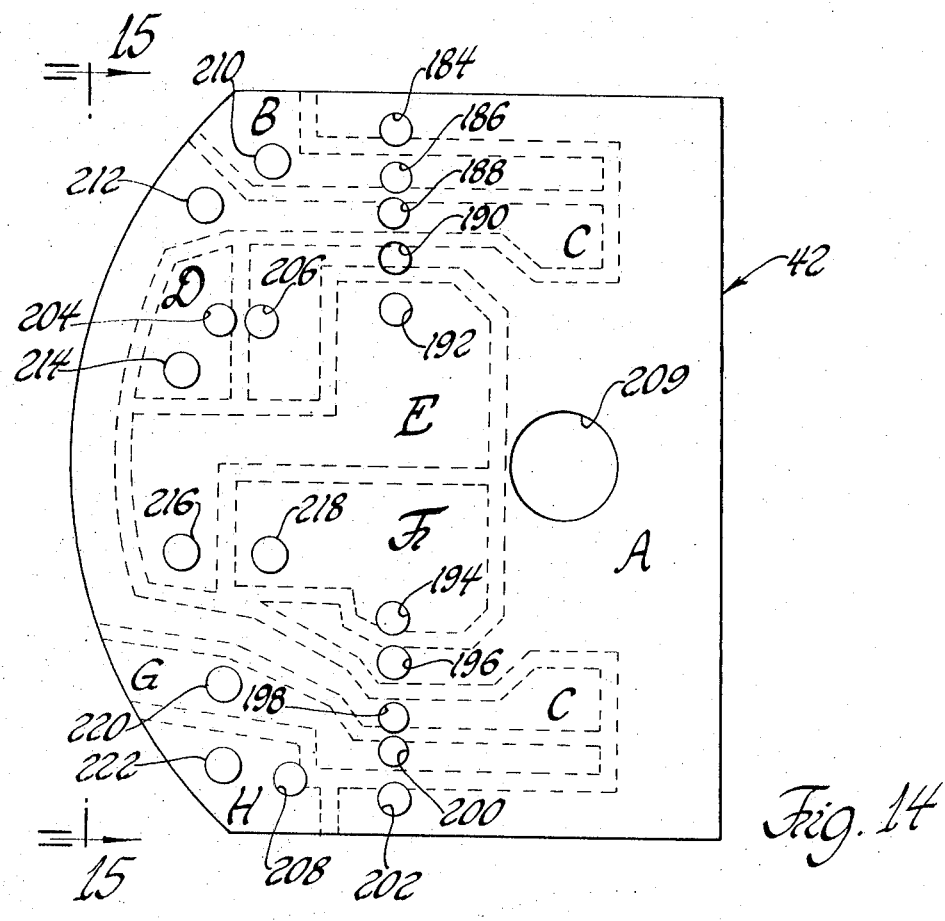
FIG. 14 is a top plan view of a printed circuit board employed within the preferred form of the invention.

FIG. 14, in enlarged scale, illustrates the printed circuit board 42 in its top plan view as it would be situated within the housing 18. The electrically conductive material comprising the various printed circuits is actually situated on the underside of the board as viewed in FIG. 14. That area appearing between the relatively narrowly spaced and generally parallel hidden lines defines the area which is not electrically conductive. Further, for ease of reference, the letters A, B, C, D, E, F, G, and H are placed over the respective areas which define discretely separate printed electrically conductive circuit areas.

A plurality of apertures 184, 186, 188, 190, 192, 194, 196, 198, 200 and 202 formed through the board 42 are adapted to respectively receive therein tab extensions 182 of leaf contact members 52, 54, 56, 58, 60, 70, 68, 66, 64 and 62 whereupon such respective extensions are electrically connected, as by soldering, to printed circuit portions A, B, C, A, E, F, A, C, G, and A, respectively. Accordingly, it can be seen that through the above described arrangement, contacts 72, 78, 88 and 82 are continuously electrically interconnected to each other by virtue of the respective extensions 182 electrically terminating in the same printed circuit portion A.

Additional apertures 204, 206 and 208 are also formed through board 42 as to similarly respectively receive tab extensions 182 of leafs 92, 94 and 100. As will be noted, this causes contact 98 to also be placed at the potential of circuit portion A and in continuous electrical connection with the other contacts already described as being continuously electrically connected to circuit portion A.

Suitable apertures are also formed in board 42 as to respectively receive and retain terminal type electrically conductive downwardly depending pins 210, 212, 214, 216, 218, 220 and 222, with such pins being preferably in a polarized pattern. Such pins are, of course, suitably electrically connected to the required printed circuit portions as by soldering.

In view of the above, and with reference to FIG. 14, it can be seen that: pin 210 is continuously electrically connected to contact 74 by virtue of printed circuit portion B and extension 182 of leaf member 54; pin 212 is continuously electrically connected to contacts 76 and 86 by virtue of printed circuit portion C and extensions 182 of leaf members 56 and 66; pin 214 is continuously electrically connected to contact 96 by virtue of printed circuit portion D and extension 182 of leaf member 92; pin 216 is continuously electrically connected to contact 80 by virtue of printed circuit portion E and extension 182 of leaf member 60; pin 218 is continuously electrically connected to contact 90 by virtue of printed circuit portion F and extension 182 of leaf 70; pin 220 is continuously electrically connected to contact 84 by virtue of printed circuit portion G and extension 182 of leaf 64; while pin 222 is continuously electrically connected to contact 82 by virtue of printed circuit portion H and extension 182 of leaf 100.

Figure 16:
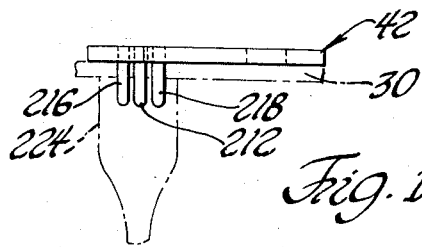
FIG. 16 is a side elevational view taken generally on the plane of line 16—16 of FIG. 15 and looking in the direction of the arrows.

The base or bottom wall 30 of housing 18 is provided with suitable clearance apertures formed therein as to thereby accommodate the passage of said pins 210–222 when the printed circuit board 42 is assembled within housing 18 and onto the lower or bottom wall 30 thereof. Pins 210–222 are of a length sufficient to extend downwardly beyond the bottom of the housing 18 so as to be adapted for connection to a cooperating female type terminal assembly typically illustrated as at 224 of FIG. 16.

Once the connector 224 is connected to the pins 210–222, the related cable of conductors would cause: pin 210 to be electrically connected to, for example, the left rear lamp means of the associated vehicle; pin 212 to be electrically connected to the output side (the switched side) of a vehicle brake actuated switch assembly; pin 214 to be electrically connected to the output side of related hazard or emergency flasher switching means; pin 216 to be electrically connected to, for example, the left front lamp means of the associated vehicle; pin 218 to be electrically connected to, for example, the right front lamp means of the associated vehicle; pin 220 to be electrically connected to, for example, the right rear lamp means of the associated vehicle; and pin 222 to be electrically connected the output side of a related turn signal flasher switching means.

Figure 21:
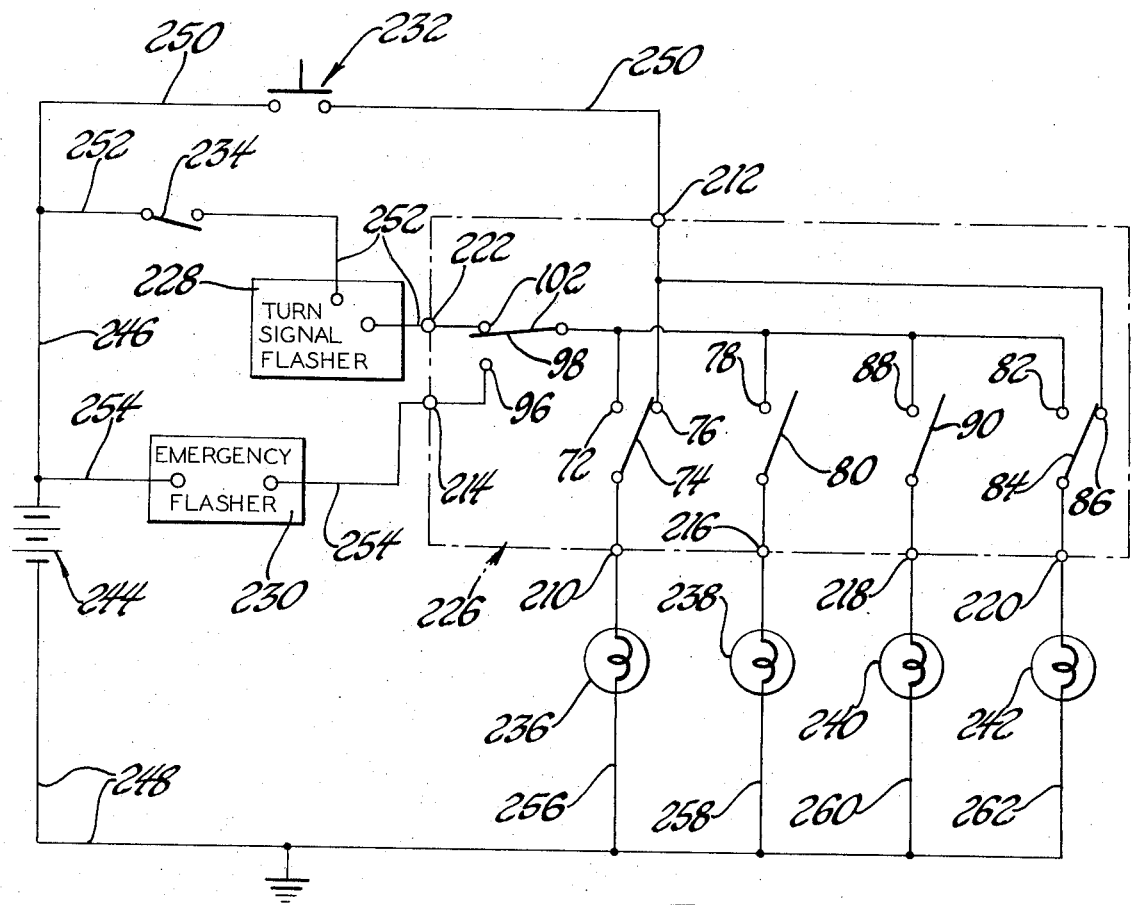
FIg. 21 is a schematic wiring diagram functionally illustrating the switch assembly of the invention.

FIG. 21 illustrates a schematic wiring diagram of the various circuits referred to above. That is, the portion included generally within the phantom line box 226 functionally comprises the switching functions of the switching assembly 10, turn signal flasher switching means 228, emergency or hazard flasher switching means 230, a vehicular brake system actuated switch means 232, vehicular engine ignition switch means 234, left rear lamp means 236, left front lamp means 238, right front lamp means 240 and right rear lamp means 242.

A source of electrical potential 244 is illustrated as having main conductors 246 and 248 with 246 being electrically connected to: conductor means 250 containing brake switch means 232 and leading to pin terminal 212; conductor means 252 containing ignition switch 234 and turn signal flasher switch 228 and leading to pin terminal 222; and conductor means 254 containing emergency flasher switch means 230 and leading to pin terminal 214. Conductor 248 is electrically connected to: conductor means 256 containing lamp means 236 and leading to pin connector 210; conductor means 258 containing lamp means 238 and leading to pin connector 216; conductor means 260 containing lamp means 240 leading to pin connector 218; and conductor means 262 containing lamp means 242 and leading to pin connector 220.

Further, for purposes of correlation, the relatively moveable and stationary contacts within switch assembly 10 are identified by corresponding reference numbers in FIG. 21 with the remaining circuitry contained within the confines of 226 being comprised generally of the printed circuit portions A, B, C, D, E, F, G and H.

As generally depicted, in relatively reduced scale in FIG. 12, housing 18 (shown in side elevation) is illustrated as having a downwardly depending bracket extension 264 which may be received against, for example, a flatted portion 266 of the steering column housing 14. A mounting screw 268 having its shank passing through the bracket 264 threadably engages an internally threaded aperture 270 in housing 14 thereby securing the switch housing 18 and assembly 10 to the steering column housing 14.

In assembling the components comprising the switch assembly 10, the contact mounting member 40 and printed circuit board 42 (already pre-assembled) are placed within housing 18 and guide pin 128 is then inserted through aperture 209 of board 42 and into the lower wall 30 of housing 18 as generally depicted in FIGS. 2 and 3. Next, the lever or actuating member is assembled as by placing the body portion 138 generally within the confines of housing 18 as by depressing detent members 148 and 150 into the body 138 in order to permit the body portion 138 to be fitted within walls 32, 34, 36 and 38 while having pin 128 pass through slot 130. The cover 20 is then placed atop the housing body 18 and attached thereto as by screws 22 and 24 which engaged internally threaded apertures 23 and 25, respectively.

As is shown in FIGS. 2, 8, 9 and 10, housing wall 32 is provided with internally formed recess-like surfaces 280, 282 which, in top plan view, are shown as being generally inclined toward each other to thereby meet and form an inverted V-like configuration. Within such surfaces 280 and 282 are further recessed surfaces or grooves 284 and 286. FIG. 11, a fragmentary cross-sectional view taken on the plane of line 11—11 of FIG. 10 further typically illustrates such surfaces 280 and 282 and grooves 284 and 286 in side elevation.

Similarly, housing wall 34 is provided with internally formed recess-like surfaces 288, 290 which, in top plan view, are shown as being inclined toward each other to thereby meet and form a generally V-like configuration. Within such surfaces 288 and 290 are further recessed surfaces or grooves 292 and 294 similar in all respects to previously described grooves 284 and 286.

When the actuator body portion 138 is assembled to housing 18, the indented or recessed surfaces 280, 282 generally receive thereagainst, the protruding portion 152 of detent member 148 while surfaces 292 and 294 generally receive, thereagainst, the protruding portion 154 of detent member 150. Because of the force of springs 144 and 146 detent member portions 152 and 154 are normally urged to a position whereat they are respectively at the juncture of surfaces 280, 282 and 288, 290 thereby resulting in the body 138 of actuator 25 being in a position as generally depicted in FIG. 1 with the result that cam portion 132 will be in a position as shown in FIG. 2.

OPERATION OF THE INVENTION

As is generally well known in the art, vehicles provided with a steering column assembly often have means, associated with the rotatable steering shaft, for providing a force to cancel-out or bring back to a null or neutral position mechanism which has been previously actuated to indicate a vehicle-turning operation. Such means is generally, and functionally typically, illustrated in phantom line at 272 of FIG. 1. The member 272 may be suitable connected to or otherwise operatively carried by the steering column shaft 16 as to be rotated thereby and in accordance therewith. Further, an upstanding actuating pin or abutment means 274 is fixedly carried by such member 272. When viewed in FIG. 1, member 272 may be considered as being below the level of U-shaped member 28 while the actuating abutment or pin 274 would be at an elevation so as to be generally between legs 160, 162 of U-shaped member 28.

When the actuator 25 is situated as generally depicted in FIG. 1, the interior components of assembly 10 will assume positions as shown in FIG. 2 which represents a null or neutral position. In this condition: contacts 72, 74 are open; contacts 76, 78 are open; contacts 78, 80 are open; contacts 90, 88 are open; contacts 88, 86 are open; contacts 84, 82 are open; and contacts 96, 98 are open while contacts 74, 76 are closed; contacts 86, 84 are closed; and contacts 98, 102 are closed (also see FIG. 21). Consequently, it can be seen that there is no possibility of current flow to any of the sensory means or lamps 236, 238, 240 and 242 from such switched sources as the turn signal flasher switch 228 or the emergency flasher 230. However, because of contacts 74, 76 and contacts 84, 86 being closed, current can pass through the vehicle operating condition indicia or lamp means 236 and 242, so as to cause energization thereof, whenever the vehicular brake responsive switch means 232 is closed.

When the associated vehicle is to undergo a right-hand turn, the operator repositions the actuator 25 so as to result in the handle portion 26 assuming a position as generally depicted at 26a of FIG. 1. Referring to both FIGS. 1 and 8, it can be seen that as actuator 25 is moved from the solid line position of FIG. 1 toward position 26a, that body portion 138 thereof is correspondingly pivotally rotated about pin 128. Such rotation, in turn, causes the protruding portions or extensions 152 and 154 of detent members 148 and 150 to traverse inclined surfaces 282 and 288, respectively. While traversing such surfaces 282 and 288, because of the angular inclination thereof, the detent members 148 and 150 are progressively moved axially inwardly of passages 140 and 142 thereby further progressively deflecting springs 144 and 146. This, in turn, can be sensed by the operator as a corresponding increasing resilient resistance to rotation of the actuator 25. Just prior to extensions 152 and 154 of detent members come into juxtaposition with grooves or slots 286 and 292 respectively, maximum resistance is attained by such extensions 152 and 154 simultaneously engaging raised surfaces 285 and 287 (with similar surfaces 285 and 287 being provided on the other side of housing 18). This is a position which is sensed by the operator permitting the operator to physically hold the actuating means in such position to indicate a forthcoming change in the lane of traffic being traversed. If at this time the actuating means 25 is released, it will return to the neutral position. However, if additional force is exerted by the operator the detent portions 152, 154 will move over the raised surfaces 285, 287 and move laterally outwardly into seated engagement with grooves or recesses 286 and 292.

Figure 8:
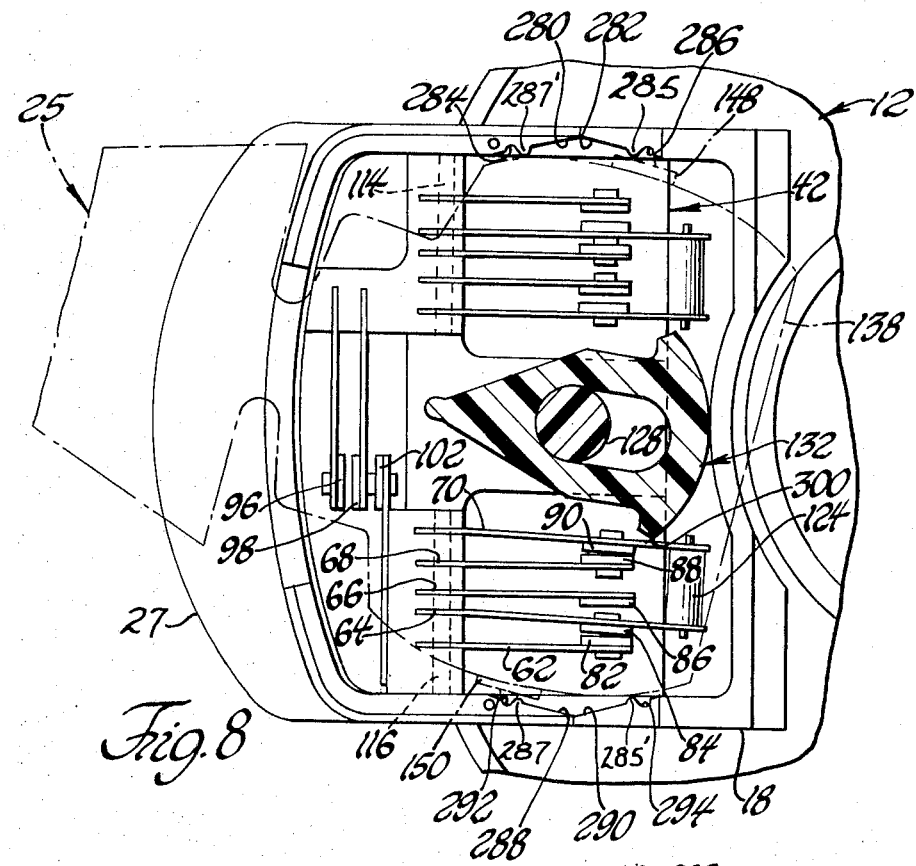
FIG. 8 is a view similar to FIG. 2 but illustrating the switch assembly in a first disclosed mode of operation.

Such action on the part of detents 148 and 150 cause the actuator 25 to be locked into position as shown generally in FIG. 8 and depicted by position line 26a of FIG. 1.

With reference to FIG. 8, it can be seen that as a consequence of such rotation of actuator body 138, cam portion 132 carried thereby has been correspondingly rotated resulting in a cam lobe or cam actuating portion 300 operatively engaging and resiliently deflecting contact leaf member 70 and, in so doing, also simultaneously and correspondingly deflecting contact leaf member 64 through the interposed non-conductive spacer or motion transmitting means 124. As a result thereof, it can be seen that previously closed contacts 86, 84 are now open and that previously open contacts 90, 88 and 84, 82 are now closed. with reference to FIG. 21, it can be seen that the resulting closure of contacts 82, 84 places the right rear lamp means 242 in circuit with the turn signal flasher means 228 which causes cyclic energization of lamp means 242 and that the resulting closure of contacts 88, 90 places the right front lamp means 240 also in circuit with the flasher means 228 for the same cyclic energization.

Referring to FIG. 1, it can be seen that when the associated vehicle has completed its right-hand turn the steering gear will be progressively turned to the left (counterclockwise) in order to again bring the vehicle to a straight path of travel. It should also be made clear that when actuator 25 was moved to the position of FIG. 8, that the metal U-shaped member 28 was correspondingly rotated about the axis of pin 128 thereby placing leg 28 in a positon shown at 28a and abutment member 166 at a position 166a. Therefore, it can be appreciated that as drive pin or abutment means 274 is moved along with member 272, as member 272 is rotated counter-clockwise pin 274 eventually strikes the somewhat inclined surface of abutment 166a creating a resultant force vector urging the abutment member 166a radially outwardly with respect to the axis of rotation of member 272. Such radially outward movement of abutment member 166 is transmitted to and through leg 28 which causes sufficient movement of actuator body 138 to enable detent portions 152, 154 to become dislodged from recesses 286 and 292 and once again is in contact with inclined surfaces 282 and 288. Springs 144 and 146, being under compression, urge detent members 148 and 150 laterally outwardly in turn causing such detent 148 and 150 to seek furthermost extended positions which causes body 138 to experience counter-clockwise rotation until detent portions 152 and 154 finally reach the juncture of surfaces 280, 282 and 288, 290 respectively. This, again, brings the switch assembly 10 to a null or neutral position. However, if the vehicle operator desires to have the actuator remain in the right-hand turn position while the operator turns the steering gear to the left, this becomes possible because of the U-shaped member 28 which is preferably formed of spring steel material. That is, all that is necessary is for the operator to physically hold the actuating means 25 in the right-hand turn position while the steering gear is rotated toward the left-hand position. During this time the means 274 will engage the abutment 166 and tend to move it generally radially outwardly. However, because of the operator holding the handle 26 in the right-hand turn position, the actuating means 25 is not permitted to return and instead leg 160 resiliently deflects generally radially outwardly permitting means 274 to move relatively to abutment 166 and eventually pass by it.

Before considering the other modes of operation of switch assembly 10, a particularly noteworthy feature should be described. That is, let it be assumed that the actuator 25 is still in the position of FIG. 8 and as depicted at position line 26a and that instead of the steering gear being turned counter-clockwise that the vehicle operator finds it necessary or desirable to turn the steering gear further clockwise. That is, with leg 28 and abutment 166 in respective positions 28a and 166a, as member 272 is rotated clockwise the actuating abutment 274 strikes the abutment 166a from the left end thereof which has a surface generally radially directed with respect to the axis of member 272.

Upon further clockwise rotation of member 272, pin 274 merely moves abutment 166a along leg 160a against the relatively light resilient resistance of spring 170 causing the abutment to be moved, for example, to some position as typically illustrated in FIG. 7 at which time pin 274 moves away from and past the abutment 166 in its continued clockwise rotation with member 272. It can be seen that there is no or substantially no resulting force tending to move leg 160a and actuator 25 back to a null condition as a consequence of member 274 engaging abutment 166a and moving it to the right. Accordingly, the abutment 166 as well as abutment 168 (since both function in a similar fashion but during different periods of operation) along with the related springs 170, 172 may be considered as also defining escapement mechanisms.

If the vehicle operator desires to indicate to others that a vehicular left-hand turn is to take place, the operator rotates the handle 26 and actuator counter-clockwise about the axis of pin 128. Since the detents 148 and 150 and detent extensions 152, 154 undergo movements and functions similar to that described with the turning of the actuator to clockwise (as to attain the condition of FIG. 8) it will suffice to merely state that during such counter-clockwise rotation detent extensions 152 and 154 traverse inclined surfaces 280 and 290, respectively, and ultimately become seated in grooves or detent recesses 284 and 294. At this time the actuator will assume the position depicted generally by the position line 26b of FIG. 1 and leg 162 and abutment 168 will correspondingly assume positions shown at 162b and 168b.

Figure 9:
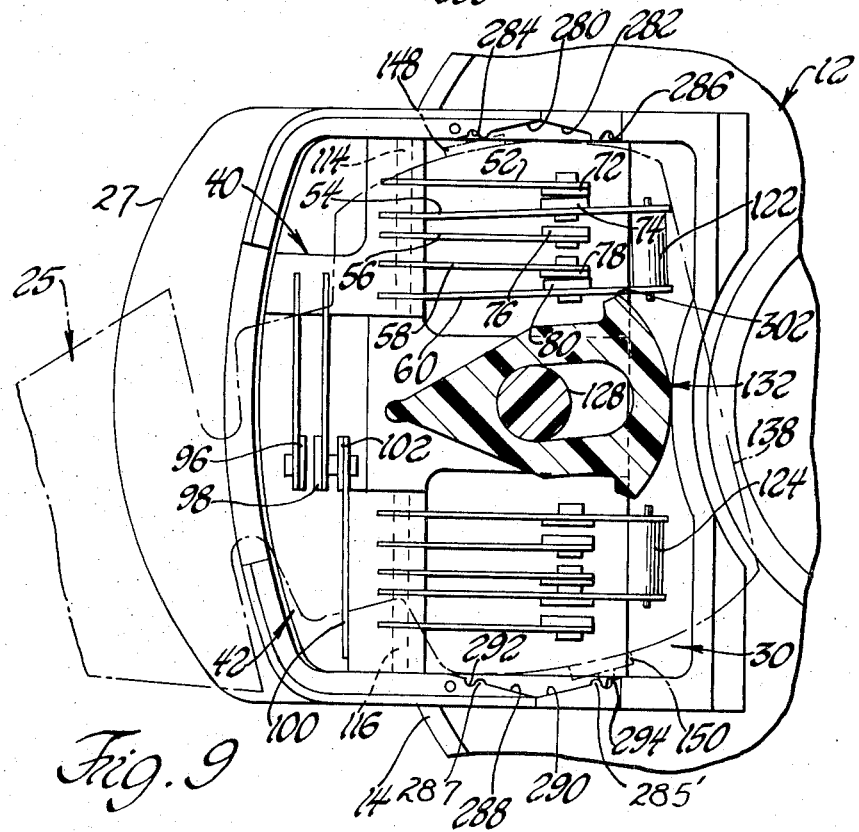
FIG. 9 is a view similar to FIGS. 2 and 8 but illustrating the switch assembly in a second disclosed mode of operation.

With reference to FIG. 9, it can be seen that as a consequence of such rotation of actuator body 138, cam portion 132 carried thereby has been correspondingly rotated resulting in a second cam lobe or cam actuating portion 302 operatively engaging and resiliently deflecting contact leaf member 60 and, in so doing, also simultaneously and correspondingly deflecting contact leaf member 54 through the interposed non-conductive spacer or motion transmitting means 124. As a result thereof, it can be seen that previously closed contacts 74, 76 are now open and that previously open contacts 72, 74 and 78, 80 are now closed. With reference to FIG. 21, it can be seen that the resulting closure of contacts 72, 74 places the left rear lamp means 236 in circuit with the turn signal flasher 228 which causes cyclic energization of lamp means 236 and that the resulting closure of contacts 78, 80 places the left front lamp means 238 also in circuit with the turn signal flasher means 228 for the same cyclic energization.

When the vehicle has either completed its left-hand turn or experiences further counter-clockwise turning of the steering gear, the pin or cancelling means 274 acts against cooperating abutment member 168b in a manner as previously described with reference to such means 274 and abutment member 166a in connection with FIG. 8.

Another mode of operation of the invention is the hazard or emergency warning condition. In this particular condition both of the front lamp means and both of the rear lamp means are simultaneously cyclically energized to thereby indicate that the vehicle is experiencing an emergency condition.

Referring to both FIGS. 1 and 10, it can be seen that actuation of the switch assembly 10 into the emergency or hazard mode is accomplished by first placing the actuator 25 in a null or neutral position, as shown in solid line in FIG. 1, and then moving the handle 26 remaining portion of the actuator means 25 to the left (as viewed in FIG. 1) generally along the longitudinal axis of the handle 26 and actuator means 25.

Such movement to the left is permitted by the elongated slot 130 as well as the clearance opening 306 in the wall 36. As the actuator means 25 is thereby moved to the left, detent portions 152 and 154 of detent members are pulled respectively along surfaces 280 and 282 thereby being progressively resiliently moved inwardly of body portion 138. Maximum effort to continue such leftward movement is required just prior to detent portions 152, 154 coming into general juxtaposition with oppositely disposed detent or latching grooves 284 and 292 at which time further movement to the left is arrested and the actuator means 25 is maintained in the position generally depicted in FIG. 10 by the spring force associated with detent portions 152 and 154 seated in said recesses 284 and 292.

As a consequence of such leftward movement of the actuator means 25, a cam portion 308 of cam 132 engages and resiliently deflects the contact leaf 94 a distance sufficient to open previously closed contacts 98, 102 and, in turn, close previously open contacts 96, 98. Simultaneously, with the opening of contacts 98, 102 and closing of contacts 96, 98, cam portion 300 causes closure of contacts 90, 88 and 84, 82 while cam portion 302 causes closure of contacts 72, 74 and 78, 80 with cam portions 300 and 302 functioning to cause displacement or deflection of the various leafs generally in the same manner as described with reference to FIGS. 8 and 9.

Referring to FIG. 21, it can be seen that such closure of contacts 98, 96 causes the turn signal flasher means 228 to be taken out of circuit and functionally replaced by the emergency or hazard warning flasher means 230. Further, since contacts 72, 74 contacts 78, 80 contacts 88, 90 and contacts 82, 84 are all respectively closed, the emergency flasher means 230 becomes effective for simultaneously cyclically energizing lamp means 236, 238, 240 and 242.

In order to again return the switch assembly 10 to a null or neutral condition, all that is required is the relatively slight application of a rightwardly directed force to the handle 26 and actuator means 25 in order to dislodge the seated detent portions 152 and 154 from recesses 284 and 292.

Even though not shown, for purposes of simplicity and clarity, it should be apparent that shoe-like members having a cam surface formed thereon may be carried as by leaf members 60 and 70 in a manner as to have such cam surfaces directed generally toward the cam member 132 thereby providing a particular cam surface on such shoe-like members against which cam portions 300 and 302 may act in achieving the various described modes of operation.

Among the many important advantages of the invention are the following. The switch assembly 10 provides a snap-acting type of contact closing and open movement because of the continuing increase in resilient resistance to movement of the actuator from null or neutral toward any one of its operating modes. Further, it becomes possible to, with a single cam portion of simple configuration, actuate a plurality of contacts in order to both open and close selected circuits. Still another important benefit of the invention is the fact that the contacts when moved to a closed position by the action of cam 132 not only engage each other but, because of the changing effective length of the related leaf undergoing deflection, also wipe across each other to some related degree thereby maintaining a clean contact area thereby maintaining a low voltage drop from contact to contact. It should also be pointed out that even though for ease of illustration the contact surfaces have been shown as flat, in the preferred form, such contacts would convex or crowned contacting surfaces as are well known in the art.

Further, the laterally extending flanges 23 and 27 respectively carried by the cover 20 portions and housing 18 serve to slideably contain and support the handle 26 against any forces applied thereto, transverse to the normal direction of rotation, when the handle 26 and actuator 25 is extended in the hazard mode of operation.

The switch means 10 also enables the ready installation and, if necessary, removal of the assembly 10 from the steering column 12 merely by the removal of the externally accessible mounting screw means 268.

Further, in certain applications as on some trucks, the self-cancelling U-shaped bracket 28 may be removed and not employed merely by the removal of screw means 156, 158.

Although only one preferred embodiment of the invention has been disclosed and described, it is apparent that other embodiments and modifications of the invention are possible within the scope of the appended claims.

We claim:

1. An electrical switch assembly, comprising a support body, cam means carried by said support body, said cam means being movable to and from various operating positions, lever means operatively connected to said cam means for selectively pivotally moving said cam means to and from certain of said various operating positions and for translationally moving said cam means to and from other of said various operating positions, a plurality of electrical contacts carried by said support body and leading to associated electrical circuitry, said plurality of electrical contacts being arranged in generally close proximity to said cam means as to be generally in the path of movement of said cam means when said cam means is moved to and from said various operating positions to thereby be selectively acted upon for opening and closing movement thereof by said cam means, said plurality of electrical contacts being adapted for electrical connection to related electrical circuitry, resilient means effective for resiliently resisting pivotal movement of said cam means by said lever means towards said certain of said operating positions the same said resilient resistance means also being effective for resiliently resisting translational movement of said cam means by said lever means toward said other of said operating positions, said resilient resistance means being effective to progressively increase the magnitude of resilient resistance as said cam means is moved toward any and all of said operating positions, and additional means effective for resiliently latching said cam means in any of said operating positions when said cam means has been moved to said any of said operating positions.

2. An electrical switch assembly according to claim 1, wherein said support body comprises a switch housing, wherein said lever means and said cam means comprise actuating means, and wherein said plurality of electrical contacts comprise a plurality of first contacts situated on one side of said cam means, a plurality of second contacts situated on another side of said cam means generally opposite to said one side, and a plurality of third contacts situated generally medially of said plurality of first and second contacts, wherein said plurality of first and second contacts are acted upon by said cam means upon pivotal rotation of said cam means by said lever means, and wherein said plurality of third electrical contacts are acted upon by said cam means upon translational movement of said cam means by said lever means.

3. An electrical switch assembly according to claim 1, wherein said support body comprises a switch housing, wherein said lever means and said cam means comprise actuating means including an actuating body portion, wherein said resilient resistance means comprises detent means carried by said actuating means, and further comprising pivot means for operatively connecting said cam means and actuating body portion to said switch housing thereby enabling said cam means to at times undergo pivotal rotation with respect thereto, detent-engaging surface means carried by said switch housing, said detent-engaging surface means being adapted for engagement by said detent means as said cam means is rotated about said pivot means to said certain of said operating positions as well as when said cam means is translationally moved by said lever means to said other of said operating positions.

4. An electrical switch assembly according to claim 1, wherein said support body comprises a switch housing, wherein said lever means and said cam means comprise actuating means including an actuating body portion, wherein said resilient resistance means comprises detent means carried by said actuating means, and further comprising pivot means for operatively connecting said cam means and actuating body portion to said switch housing thereby enabling said cam means to at times undergo pivotal rotation with respect thereto, said pivot means and a part of said actuating body portion cooperating to define lost motion connecting means operatively connecting said cam means to said switch housing for at times enabling pivotal rotation of said cam means about the axis of said pivot means and at other times enabling translational movemnt of said cam means with respect to said axis.

5. An electrical switch assembly according to claim 4, wherein said plurality of electrical contacts comprises a plurality of first electrical contacts situated on one side of said cam means, a plurality of second electrical contacts situated on another side of said cam means generally opposite to said one side, and a plurality of third electrical contacts, and wherein said linear translational movement is generally medially of said plurality of first electrical contacts and said plurality of second electrical contacts, said plurality of third electrical contacts being so situated as to be generally in the path of movement of said cam means when said cam means is undergoing said translational movement thereby enabling said cam means to act upon said third electrical contacts.

6. An electrical switch assembly according to claim 3, wherein said detent-engaging surface means comprises first surface means formed on one side of said switch housing and second surface means formed on another side of said switch housing generally opposite to said one side, and wherein said additional means comprises first and second spaced latching surfaces carried on said one side of said switch housing, and third and forth spaced latching surfaces carried on said other side of said switch housing, said first and fourth spaced latching surfaces being effective to simultaneously engage said detent means upon pivotal rotation of said actuating body portion and said cam means in a first angular direction about said pivot means to thereby maintain said cam means in one of said certain of said operating positions, said second and third spaced latching surfaces being effective to simultaneously engage said detent means upon pivotal rotation of said actuating body portion and said cam means in a second angular direction opposite to said first angular direction about said pivot means to thereby maintain said cam means in a second of said certain of said operating positions, and said first and third spaced latching means being effective to simultaneously engage said detent means upon said actuating body portion and said cam means being translationally moved to said other of said operating positions to thereby maintain said cam means in said other of said operating positions.

7. An electrical switch assembly according to claim 6, wherein said detent means comprises first and second plunger-like detent members carried by said actuating body as to be laterally disposed, wherein said resilient resistance means comprises resilient means carried by said actuating body for resiliently urging said detent members outwardly of said actuating body, wherein said first and second surface means are each formed as to have a generally medially situated portion thereof disposed a greatest distance away from actuating body whereby said detent members are in engagement with said medially situated portions whenever said cam means is in a neutral non-operating position, wherein said first and second latching surfaces are formed generally in said first surface means in a manner as to be spaced on either side of the medially situated portion of said first surface means, and wherein said third and fourth latching surfaces are formed generally in said second surface means in a manner as to be spaced on either side of the medially situated portion of said second surface means.

8. An electrical switch assembly according to claim 7, and further comprising means carried by said actuating means adapted for operative engagement by associated steering gear means and in accordance therewith causing said cam means to move from an operating position to a neutral non-operating position, said means carried by said actuating means for operative engagement by associated steering gear means comprising lost motion abutment means for preventing said cam means from moving from an operating position to a neutral non-operating position whenever the said associated steering gear means is operated in a direction indicative of the continuance of said operating position.

9. An electrical switch assembly, comprising a support body, cam means carried by said support body, lever means operatively connected to said cam means for moving said cam means to and from various operating positions, a plurality of electrical contacts carried by said support body and arranged in generally close proximity to said cam means, said plurality of electrical contacts being adapted for electrical connection to related electrical circuitry, resilient resistance means effective for resiliently resisting movement of said cam means by said lever means towards any of said operating positions, said resilient resistance means being effective to progressively increase the magnitude of resilient resistance as said cam means is moved toward any of said operating positions additional means effective for resiliently latching said cam means in any of said operating positions when said cam means has been moved to said any of said operating positions, said support body comprising a switch housing, said lever means and said cam means comprising actuating means including an actuating body, said plurality of electrical contacts comprising a plurality of first electrical contact means situated on one side of said cam means, a plurality of second electrical contact means situated on another side of said cam means generally opposite to said one side, and a plurality of third electrical contact means situated generally medially of said plurality of first electrical contact means and said plurality of second electrical contact means, said resilient resistance means comprising detent means carried by said actuating body, pivot means for operatively pivotally connecting said cam means and actuating body to said switch housing, detent-engaging surface means carried by said switch housing, said detent-engaging surface means being adapted for engagement by said detent means as said cam means is rotated about said pivot means, said detent-engaging surface means comprising first surface means formed on one side of said switch housing internally thereof and second surface means formed on an other side of said switch housing internally thereof and generally opposite to said first surface means, said first and second surface means each being formed as to have a generally medially situated portion thereof disposed a greatest distance away from said actuating body wherein said detent means are in engagement with said medially situated portions whenever said cam means is in a neutral non-operating position, said detent means comprising first and second plunger-like detent members carried by said actuating body as to be generally laterally disposed with respect thereto, spring means carried by said actuating body for resiliently urging said first and second detent members laterally outwardly of said actuating body and in respective sliding engagement with said first and second surface means, said additional means comprising first and second spaced latching surfaces carried on said one side of said switch housing and third and fourth spaced latching surfaces carried on said other side of said switch housing, said first and third latching surfaces being effective to simultaneously engage said first and second detent members in order to thereby maintain said cam means in one of said operating positions, said second and fourth spaced latching surfaces being effective to respectively simultaneously engage said first and second detent members in order to thereby maintain said cam means in an other of said operating positions, said second and third spaced latching surfaces being effective to simultaneously engage said first and second detent members in order to thereby maintain said cam means in a third of said operating positions, said plurality of first contact means comprising at least first, second and third electrical contacts which are acted upon by said cam means when said cam means is in said one of said operating positions in order to open said first and second electrical contacts and close said second and third electrical contacts thereby completing circuitry to first associated sensory means, said plurality of second contact means comprising at least fourth, fifth and sixth electrical contacts which are acted upon by said cam means when said cam means is in said other of said operating positions in order to open said fourth and fifth electrical contacts and close said fifth and sixth electrical contacts thereby completing circuitry to second associated sensory means, slot means formed in said actuator body permitting translational motion of said cam means to said third operating position, and said plurality of third electrical contact means comprising seventh, eighth and ninth electrical contacts which are acted upon by said cam means when said cam means is translationally moved to said third operating position in order to open said seventh and eighth electrical contacts and close said eighth and ninth electrical contacts.

10. A turn signal electrical switching assembly in combination with vehicular steering gear means including steering shaft means having means presented to the vehicle operator for steerable positioning by the operator, comprising first housing means for containing at least a portion of said steering gear means, second housing means generally carrying at least a portion of switching means comprising said switching assembly, said switching means having at least one operating position and a non-operating position, said switching means being provided with abuttably actuatable means effective when said switching means is in said at least one operating position to be placed generally in the path of travel of actuating means carried by said steering shaft means, said actuatable means having first and second actuatable portions extending as to be situated generally at opposite sides of said steering shaft means so as to have the axis of said steering shaft means passing between said actuatable portions, said actuatable portions being effective when respectively abuttably engaged and moved by said actuating means to return said switching means from said operating position to said non-operating position, aperture means formed in a wall of said first housing means, said aperture means being of a size and configuration permitting the passage therethrough of at least a portion of said electrical switching assembly, and mounting means carried by said second housing means, said mounting means being effective to be detachably secured to said first housing means thereby enabling the withdrawal of said second housing means and said actuatable portions out of said aperture means while maintaining said steering gear means in assembled condition and while maintaining said means presented to the vehicle operator for steerable positioning in assembled condition to said steering shaft means.

11. In a steering column assembly having steering shaft means connectable at one end to ground engaging running gear means of an associated vehicle, said steering shaft means also being connectable at one end opposite to said one end to operator positionable steering means whereby said operator is able to selectively angularly rotatably position said steering shaft means and correspondingly position said ground engaging running gear means thereby imparting desired directional travel to said associated vehicle, a generally tubular housing means generally circumscribing at least a portion of said steering shaft means, a turn signal means comprising a portion of said steering column assembly, said turn signal means having a first means operatively connected to said steering shaft means, said first means comprising turning indicia means effective for providing an indicia of the direction in which said steering shaft means is being angularly rotated, said turn signal means also comprising an electrical switching section manually positionable to selected positions by said operator to indicate a forthcoming change in direction of travel of said associated vehicle, said switching section comprising switching portions extending generally along opposite sides of said steering shaft means for operative engagement by said first means, aperture means formed in the side wall of said tubular first housing as to enable the extension therethrough of a portion of said electrical switching section in order to permit operator control thereof, said first means being effective to at times operatively engage said switching portions in order to return said switching section to a neutral position from which said switching section had been actuated by said operator, said first means further being removable from said steering column assembly only by withdrawal of said first means through an end of said tubular housing only after removal of said operator positionable steering means from said steering shaft means, and said switching section being removable from said steering column assembly by withdrawal thereof through said aperture means formed in the side wall of said tubular housing.

12. An electrical switch assembly, comprising a support body, cam means carried by said support body, lever means operatively connected to said cam means for pivotally and translationally moving said cam means to and from various operating positions, a plurality of electrical contacts carried by said support body and arranged in generally close proximity to said cam means, said plurality of electrical contacts being adapted for electrical connection to related electrical circuitry, resilient resistance means effective for resiliently resisting movement of said cam means by said lever means towards any of said operating positions, said resilient resistance means being effective to progressively increase the magnitude of resilient resistance as said cam means is moved toward any of said operating positions, additional means effective for resiliently latching said cam means in any of said operating positions when said cam means has been moved to said any of said operating positions, said support body comprising a switch housing, said lever means and said cam means comprising actuating means including an actuating body, said plurality of electrical contacts comprising a plurality of first electrical contact means situated on one side of said cam means, a plurality of second electrical contact means situated on an other side of said cam means generally opposite to said one side, and a plurality of third electrical contact means situated generally medially of said plurality of first electrical contact means and said plurality of second electrical contact means, said resilient resistance means comprising detent means carried by said actuating body, pivot means for operatively pivotally connecting said cam means and actuating body to said switch housing, detent-engaging surface means carried by said switch housing, said detent-engaging surface means being adapted for engagement by said detent means as said cam means is rotated about said pivot means, said detent-engaging surface means comprising first surface means carried on one side of said switch housing internally thereof and second surface means carried on an other side of said switch housing internally thereof and generally opposite to said first surface means, said first and second surface means each being formed as to have a generally medially situated portion thereof disposed a greatest distance away from said actuating body wherein said detent means are in engagement with said medially situated portions whenever said cam means is in a neutral non-operating position, said detent means comprising first and second plunger-like detent members carried by said actuating body as to be generally laterally disposed with respect thereto, spring means carried by said actuating body for resiliently urging said first and second detent members laterally outwardly of said actuating body and in respective sliding engagement with said first and second surface means, said additional means comprising first and second spaced latching surfaces carried on said one side of said switch housing and third and fourth spaced latching surfaces carried on said other side of said switch housing, said first and third latching surfaces being effective to simultaneously engage said first and second detent members in order to thereby maintain said cam means in one of said operating positions, said second and fourth spaced latching surfaces being effective to respectively simultaneously engage said first and second detent members in order to thereby maintain said cam means in an other of said operating positions, said second and third spaced latching surfaces being effective to simultaneously engage said first and second detent members in order to thereby maintain said cam means in a third of said operating positions, said plurality of first contact means comprising at least first and second electrical contacts which are acted upon by said cam means when said cam means is in said one of said operating positions in order to open said first and second electrical contacts leading to first associated sensory means, said plurality of second contact means comprising at least third and fourth electrical contacts which are acted upon by said cam means when said cam means is in said other of said operating positions in order to open said third and fourth electrical contacts leading to second associated sensory means, a space defined generally between a portion of said pivot means and a portion of said actuator body for permitting translational motion of said actuator body and cam means to said third operating position, and said plurality of third electrical contacts comprising at least fifth and sixth electrical contacts which are acted upon by said cam means when said cam means is translationally moved to said third operating position in order to close said fifth and sixth electrical contacts.

13. An electrical switch assembly, comprising a support body, cam means carried by said support body, lever means operatively connected to said cam means for pivotally and translationally moving said cam means to and from various operating positions, a plurality of electrical contacts carried by said support body and arranged in generally close proximity to said cam means, said plurality of electrical contacts being adapted for electrical connection to related electrical circuitry, resilient resistance means effective for resiliently resisting movement of said cam means by said lever means towards any of said operating positions, said resilient resistance means being effective to progressively increase the magnitude of resilient resistance as said cam means is moved toward any of said operating positions, additional means effective for resiliently latching said cam means in any of said operating positions when said cam means has been moved to said any of said operating positions, said support body comprising a switch housing, said lever means and said cam means comprising actuating means including an actuating body, said plurality of electrical contacts comprising a plurality of first electrical contact means situated on one side of said cam means, a plurality of second electrical contact means situated on an other side of said cam means generally opposite to said one side, and a plurality of third electrical contact means situated generally medially of said plurality of first electrical contact means and said plurality of first electrical contact means and said plurality of second electrical contact means, said resilient resistance means comprising detent means carried by said actuating body, pivot means for operatively pivotally connecting said cam means and actuating body to said switch housing, detent-engaging surface means carried by said switch housing, said detent-engaging surface means being adapted for engagement by said detent means as said cam means is rotated about said pivot means, said detent-engaging surface means comprising first surface means carried on one side of said switch housing internally thereof and second surface means carried on an other side of said switch housing internally thereof and generally opposite to said first surface means, said first and second surface means each being formed as to have a generally medially situated portion thereof disposed a greatest distance away from said actuating body wherein said detent means are in engagement with said medially situated portions whenever said cam means is in a neutral non-operating position, said detent means comprising first and second plunger-like detent means carried by said actuating body as to be generally laterally disposed with respect thereto, spring means carried by said actuating body for resiliently urging said first and second detent members laterally outwardly of said actuating body and in respective sliding engagement with said first and second surface means, said additional means comprising first and second spaced latching surfaces carried on said one side of said switch housing and third and fourth spaced latching surfaces carried on said other side of said switch housing, said first and third latching surfaces being effective to simultaneously engage said first and second detent members in order to thereby maintain said cam means in one of said operating positions, said second and fourth spaced latching surfaces being effective to respectively simultaneously engage said first and second detent members in order to thereby maintain said cam means in an other of said operating positions, said second and third spaced latching surfaces being effective to simultaneously engage said first and second detent members in order to thereby maintain said cam means in a third of said operating positions, said plurality of first contact means comprising at least first and second electrical contacts which are acted upon by said cam means when said cam means is in said one of said operating positions in order to close said first and second electrical contacts thereby completing circuitry to first associated sensory means, said plurality of second contact means comprising at least third and fourth electrical contacts which are acted upon by said cam means when said cam means is in said other of said operating positions in order to close said third and fourth electrical contacts thereby completing circuitry to second associated sensory means, a space defined generally between a portion of said pivot means and a portion of said actuator body for permitting translational motion of said actuator body and cam means to said third operating position, and said plurality of third electrical contacts comprising at least fifth and sixth electrical contacts which are acted upon by said cam means when said cam means is translationally moved to said third operating position in order to open said fifth and sixth electrical contacts.

14. A modular turn signal assembly detachably mounted as a unit on a transverse side of a first housing of a steering column assembly, said modular turn signal assembly comprising a switch assembly comprising a second housing inserted through a like-shaped aperture formed through a sidewall of said first housing, switch means mounted in said second housing, an actuating mechanism comprising a cam pivotally mounted in said second housing adjacent to said switch means, a handle secured to said cam and projecting radially outwardly from said second housing to rotate said cam to selectively actuate said switch means, detent means operatively associated between said switch assembly and said actuating mechanism for releasably holding said handle in a left-turn a right-turn or an intermediate neutral condition of turn signal operation, and turn cancelling means operatively associated between said steering column assembly and said actuating mechanism for automatically releasing said detent means and for returning said handle from its left-hand or right-hand to its neutral condition of operation upon selective turning of a steering wheel of said steering column assembly, said turn cancelling means comprising a generally U-shaped member having its base secured on an end of said handle and a pair of legs projecting into said first housing, said turn cancelling means further comprising abutment means slidably mounted on each of said legs and positioned thereon to engage a drive means of said steering column assembly upon rotation of said steering wheel in a first direction to return said handle to its neutral condition of operation and to disengage said drive means by moving generally tangentially relative to the rotational path of said drive means upon rotation of said steering wheel in an opposite second direction to permit said handle to remain in its left-hand or right-hand condition of operation.

15. A modular turn signal assembly detachably mounted as a unit on a transverse side of a first housing of a steering column assembly, said modular turn signal assembly comprising a switch assembly comprising a second housing inserted through a like-shaped aperture formed through a sidewall of said first housing, switch means mounted in said second housing, an actuating mechanism comprising a cam pivotally mounted in said second housing adjacent to said switch means, a handle secured to said cam and projecting radially outwardly from said second housing to rotate said cam to selectively actuate said switch means, said switch means comprising first and second sets of electrical contacts mounted in said second housing on opposite sides of said cam and a third set of electrical contacts mounted in said second housing adjacent to an end of said cam, and further comprising lost-motion means pivotally mounting said cam in said second housing for permitting said handle to be reciprocated longitudinally to selectively actuate said third set of electrical contacts.

16. A modular turn signal assembly according to claim 15 and further comprising detent means operatively associated between said second housing and said handle for releasably holding said handle in a left-turn a right-turn or an intermediate neutral condition of turn signal operation, and turn cancelling means operatively connected to said handle and adapted to be between a steering column assembly and said handle for automatically releasing said detent means and for returning said handle from its left-hand or right-hand to its neutral condition of operation, said turn cancelling means comprising a pair of laterally spaced legs secured to an end of said handle to project outwardly therefrom, and abutment means slidably mounted on each of said legs for limited outward movement in a direction away from said handle.

17. The turn signal assembly according to claim 16 and further comprising retraction spring means connected between each of said abutment means and a respective one of said legs to normally bias and retract such abutment means towards said handle.

18. The turn signal assembly according to claim 17 and further comprising stop means formed on each of said legs to limit travel of a respective one of said abutment means towards said handle.

19. The turn signal assembly according to claim 16 wherein said legs diverge away from each other as said legs extend from said handle.

20. The turn signal assembly according to claim 17 and further comprising an elongated slot formed in each of said legs for accommodating outward expansion of a respective one of said spring means.

21. The turn signal assembly according to claim 16 and further comprising a plurality of electrical terminals electrically connected to said switch means and exposed exteriorly on one side of said housing, said plurality of electrical terminals being adapted to have an electrical connector detachably connected thereto.

22. The turn signal assembly according to claim 21 wherein said electrical terminals are electrically connected to said switch means by a flat printed circuit board disposed in said housing.

23. In a turn signal switch assembly having a plurality of first electrical contacts adapted to be acted upon by contact-actuating-means selectively angularly positionable by associated manually positionable handle means operatively connected to said contact-actuating-means and detent means effective for maintaining said contact-actuating-means in selected angular positions, the improvement of providing guide means for enabling said handle means and said contact-actuating-means to undergo translational movement, second electrical contact means positioned so as to be acted upon by said contact-actuating-means when said handle means and said contact-actuating-means are translationally moved a first predetermined distance in a first translational direction to a first translational position, said detent means comprising first and second spaced latching surfaces respectively positioned on opposite sides of said contact-actuating-means and said guide means, said detent means also comprising resiliently deflectable detent members operatively connected to said handle means and said contact-actuating-means as to be both angularly and translationally movable therewith, and ramp-like surfaces respectively positioned on opposite sides of said contact-actuating-means and said guide means and respectively leading to said first and second latching surfaces, said ramp-like surfaces being adapted to be respectively engaged by said deflectable detent members and effective to through said detent members normally urge said handle means and said contact-actuating-means to a second translational position whereat said handle means and said contact-actuating-means are neither angularly rotated to a selected angular position nor acting upon said second electrical contact means, said ramp-like surfaces and said detent members cooperating to produce a progressively increasing resilient resistance force to the manual translational movement of said handle means and said contact-actuating-means from said second translational position toward said first translational position, said first latching surface being effective to receive one of said detent members when said handle means and said contact-actuating-means are rotated to a first angular position, said second latching surface being effective to receive another of said detent members when said handle means and said contact-actuating-means are rotated to a second angular position, and said first and second latching surfaces being effective to simultaneously respectively receive said one and said other of said detent members when said handle means and said contact-actuating-means have been translationally moved to said first translational position.

24. A turn signal switch assembly according to claim 23 wherein said plurality of first electrical contacts are also acted upon by said contact-actuating-means when said handle means and said contact-actuating-means are translationally moved to said first translational position.

25. A turn signal switch assembly according to claim 23 wherein said guide means comprises a pivot member and a cooperating slot relatively movable with respect to each other, and wherein said pivot member is held against one functional end of said slot when said handle means and said contact-actuating-means are in said second translational position thereby permitting angular rotation of said handle means and said contact-actuating-means about said pivot member.

26. A turn signal switch assembly according to claim 23 and further comprising additional means operatively connected to said contact-actuating-means effective for automatically returning said contact-actuating-means and said handle means to said second translational position from any said selected angular position originally maintained by said detent means, said additional means being adapted to at times be situated generally in the path of travel of driving means operatively connected to and controlled by associated vehicular steering gear means, said driving means being effective to undergo angular rotation in the same angular direction as the steering shaft which comprises a portion of said steering gear means, said additional means being effective to be abutingly engaged by driving means and return said handle means and said contact-actuating-means to said second translational position from a selected angular position indicating a vehicular turning operation in a first direction when said steering shaft is being rotated in a direction causing a vehicular turning operation in a second direction opposite to said first direction, said additional means having an opening formed therein for permitting the lateral passage therethrough of said steering shaft and thereby enabling the removal of said additional means from said steering shaft by movement of said additional means transverse to said steering shaft.

27. A turn signal switch assembly according to claim 26 wherein said additional means is at least partly resilient thereby enabling said handle means and said contact-actuating-means to, by application of a manual restraining force to said handle means, remain in said angular position indicating a vehicular turning operation in said first direction even though said steering shaft is being rotated in said second direction and said driving means is engaging said additional means to tend to return said handle means and said contact-actuating-means to said second translational position.

28. A turn signal switch assembly according to claim 27 wherein said additional means comprises abutment means resiliently movable in one direction to act as an escapement when engaged by said driving means rotating in a direction the same as the direction of vehicular turning indicated by said handle means and said contact-actuating-means.

29. A turn signal switch assembly according to claim 27 wherein said additional means comprises first and second resilient arms adapted to be respectively disposed on opposite diametrical sides of said associated steering shaft, first and second abutment members respectively slideably carried by said first and second resilient arms, first and second spring means respectively connecting said first and second abutment members to said first and second resilient arms, said first and second spring means each being effective to respectively urge said first and second abutment members to respective first positions with respect to said first and second resilient arms, and said first and second spring means also being effective to at times permit said first and second abutment members to move with respect to said arms when such abutment members are engaged by said driving means.

* * * * *

UNITED STATES PATENT OFFICE
CERTIFICATE OF CORRECTION

Patent No. 3,858,176     Dated December 31, 1974

Inventor(s) Gerald K. Miller; Dale L. Bull & Norman A. Rautiola

Figure 17:
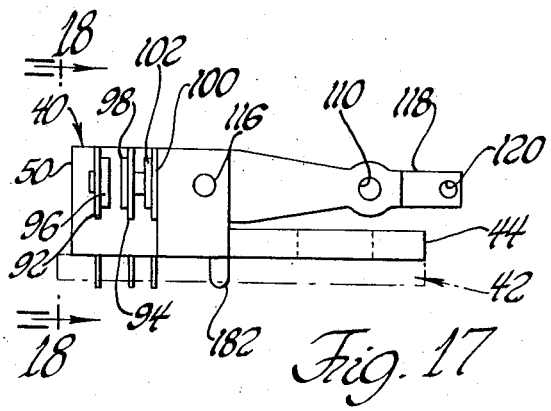
FIG. 17 is a side elevational view of some of the contacts within the switch assembly taken generally on the plane of line 17—17 of FIG. 10 and looking in the direction of the arrows.
Figure 15:
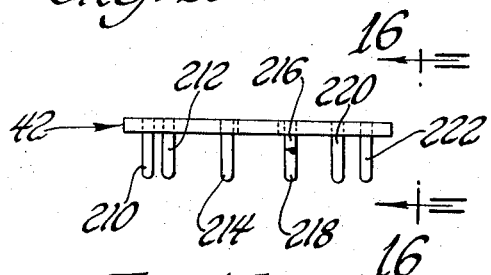
FIG. 15 is an end elevational view, in reduced scale, taken generally on the plane of line 15—15 of FIG. 14 and looking in the direction of the arrows.

It is certified that error appears in the above-identified patent and that said Letters Patent are hereby corrected as shown below:

Column 2, line 37, change "Fig. 1" to ---Fig. 17---.

Column 4, line 33, change "160" to ---169---.

Column 7, line 43, change "suitable" to ---suitably---.

Claim 1, line 19 thereof, after "resilient" insert ---resistance---.

Claim 4, line 16 thereof, change "movemnt" to ---movement---.

Claim 6, line 9 thereof, change "forth" to ---fourth---.

Claim 9, line 15 thereof, immediately after "positions" insert a comma.

Claim 13, lines 29 and 30 thereof, cancel "of first electrical contact means and said plurality".

Claim 13, line 50 thereof, immediately before "carried" cancel "means" and substitute therefor ---members---.

Signed and Sealed this

Third Day of October 1978

[SEAL]

Attest:

RUTH C. MASON
*Attesting Officer*

DONALD W. BANNER
*Commissioner of Patents and Trademarks*